United States Patent
Tonouchi (10) Patent No.: US 8,913,258 B2
(45) Date of Patent: Dec. 16, 2014

(54) IMAGE PROCESSING APPARATUS AND METHOD AND COMPUTER READABLE MEDIUM

(75) Inventor: Masaharu Tonouchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 148 days.

(21) Appl. No.: 13/458,632

(22) Filed: Apr. 27, 2012

(65) Prior Publication Data

US 2013/0063739 A1    Mar. 14, 2013

(30) Foreign Application Priority Data

Sep. 12, 2011    (JP) ................. 2011-198404

(51) Int. Cl.
| | |
|---|---|
| G06F 3/12 | (2006.01) |
| G06K 15/00 | (2006.01) |
| G06K 9/46 | (2006.01) |
| B41J 2/205 | (2006.01) |
| G06K 15/02 | (2006.01) |

(52) U.S. Cl.
CPC ........ G06K 15/1865 (2013.01); G06K 15/1893 (2013.01); G06K 15/1851 (2013.01); G06K 15/1852 (2013.01)
USPC ............ 358/1.13; 358/3.03; 382/243; 347/15

(58) Field of Classification Search
None
See application file for complete search history.

(56) References Cited

U.S. PATENT DOCUMENTS

| | | | | |
|---|---|---|---|---|
| 8,366,228 | B2 * | 2/2013 | Yoshida ........................ | 347/15 |
| 2005/0088697 | A1 * | 4/2005 | Yasutomi et al. ............. | 358/2.1 |
| 2005/0123209 | A1 * | 6/2005 | Kitora et al. ................. | 382/243 |
| 2005/0162676 | A1 * | 7/2005 | Aoki ............................ | 358/1.13 |
| 2008/0225341 | A1 * | 9/2008 | Ono et al. .................... | 358/3.03 |
| 2009/0303550 | A1 | 12/2009 | Hirabayashi | |
| 2011/0141508 | A1 | 6/2011 | Inoue et al. | |

FOREIGN PATENT DOCUMENTS

| | | |
|---|---|---|
| EP | 0772162 A2 | 5/1997 |
| EP | 1557748 A2 | 7/2005 |
| JP | 08-279915 A | 10/1996 |
| JP | 2000-198241 A | 7/2000 |
| JP | 2000-358144 A | 12/2000 |
| JP | 2011-123757 A | 6/2011 |

OTHER PUBLICATIONS

Office Action issued by Australian Patent Office in corresponding Australian Patent application No. 2012203126, dated Jun. 28, 2013.

* cited by examiner

*Primary Examiner* — Tammy Pham
*Assistant Examiner* — Frantz Bataille
(74) *Attorney, Agent, or Firm* — Sughrue Mion, PLLC (57) ABSTRACT

An image processing apparatus includes an obtaining unit and a combining unit. The obtaining unit obtains, from attribute information, data format information indicating data formats of first image data representing a first image and second image data representing a second image. The attribute information is included in the first image data and the second image data. The first image is printed at predetermined positions in all units of printing. The second image is changed in accordance with the individual units of printing and is printed at predetermined positions in the individual units of printing. The combining unit divides the first image data and the second image data in accordance with the data formats, and combines compressed data generated by compressing raster data of the first image data with compressed data generated by compressing raster data of the second image data, depending on amounts of image represented by divided portions.

4 Claims, 7 Drawing Sheets

```
<PPML>
 <JOB>
  <REUSABLE_OBJECT>
   <OBJECT Position="0 0">
    <SOURCE Format="application/pdf" Dimension="w1 h1">
     < EXTERNAL_DATA Src="logo_1.pdf"/>
    </SOURCE>
   </OBJECT>
   <OCCURRENCE_LIST>
    <OCCURRENCE NAME="logo_1" Weight="100">
     <VIEW>
      <CLIP_RECT Rectangle="a1 b1 c1 d1"/>
     </VIEW>
    </OCCURRENCE>
   </OCCURRENCE_LIST>
   <OBJECT Position="0 0">
    <SOURCE Format="application/pdf" Dimension="w1 h1">
     < EXTERNAL_DATA Src="content_1.pdf"/>
    </SOURCE>
   </OBJECT>
   <OCCURRENCE_LIST>
    <OCCURRENCE NAME="content_1" Weight="100">
     <VIEW>
      <CLIP_RECT Rectangle="a1 b1 c1 d1"/>
     </VIEW>
    </OCCURRENCE>
   </OCCURRENCE_LIST>
  </REUSABLE_OBJECT>
```

FIG. 2D

```xml
<DOCUMENT>
 <PAGE>
  <PAGE_DESIGN TrimBox="t1 t2 t3 t4"/>
  <MARK Position="x1 y1">
   <OCCRRENCE_REF Ref="logo_1"/>
  </MARK>
  <MARK Position="x2 y2">
   <OCCRRENCE_REF Ref="content_1"/>
  </MARK>
  <MARK Position="x3 y3">
    <OBJECT Position="0 0">
    <SOURCE Fromat="application/pdf" Dimension="w2 h2">
     <EXTERNAL_DATA Src="picture_1.pdf">
    </SOURCE>
    <CLIP_RECT Rectangle="a2 b2 c2 d2"/>
    </OBJECT>
   </MARK>
   <MARK Position="x4 y4">
   <OBJECT Position="0 0">
    <SOURCE Fromat="application/pdf" Dimension="w3 h3">
     <EXTERNAL_DATA Src="content_2.pdf">
    </SOURCE>
    <CLIP_RECT Rectangle="a3 b3 c3 d3"/>
    </OBJECT>
   </MARK>
  </PAGE>
 </DOCUMENT>
 <DOCUMENT>
  <PAGE>
   <PAGE_DESIGN TrimBox="t1 t2 t3 t4"/>
   <MARK Position="x1 y1">
    <OCCRRENCE_REF Ref="logo_1"/>
   </MARK>
   <MARK Position="x2 y2">
    <OCCRRENCE_REF Ref="content_1"/>
   </MARK>
      <MARK Position="x3 y3">
        ................
       ....................
       ....................
 </DOCUMENT>
```

IMAGE PROCESSING APPARATUS AND METHOD AND COMPUTER READABLE MEDIUM

CROSS-REFERENCE TO RELATED APPLICATIONS

This application is based on and claims priority under 35 USC 119 from Japanese Patent Application No. 2011-198404 filed Sep. 12, 2011.

BACKGROUND (i) Technical Field

The present invention relates to an image processing apparatus and method, and a computer readable medium.

(ii) Related Art

A printing technology, so-called "variable printing", is available for performing printing of documents each including a portion in which images used for all the documents are printed and a portion in which images that can be changed depending on the individual documents are printed.

SUMMARY

According to an aspect of the invention, there is provided an image processing apparatus including an obtaining unit and a combining unit. The obtaining unit obtains, from attribute information, data format information indicating data formats of first image data representing a first image and second image data representing a second image, the attribute information being included in each of the first image data and the second image data, the first image being printed at predetermined positions in all units of printing, the second image being changed in accordance with the individual units of printing and being printed at predetermined positions in the individual units of printing. The combining unit divides the first image data and the second image data in accordance with the data formats described in the data format information, and combines compressed data generated by compressing raster data representing the first image data with compressed data generated by compressing raster data representing the second image data, depending on amounts of image represented by portions of the first image data and the second image data divided in accordance with the data formats described in the data format information.

BRIEF DESCRIPTION OF THE DRAWINGS

An exemplary embodiment of the present invention will be described in detail based on the following figures, wherein.

DETAILED DESCRIPTION

Overview

In this exemplary embodiment of the invention, an image processing apparatus will be described below in the form of an image forming apparatus including the image processing apparatus by way of example. In this image forming apparatus, variable printing is performed for printing printed matter for personal use, for example, direct mail and service statements. More specifically, variable printing is performed by disposing objects (which form image data items representing graphics, images, such as photographs, and characters) on paper. In this case, the objects form a fixed portion which is printed for all pages and a variable portion which is changed for individual pages. In the fixed portion, for example, objects, such as a logo of a company that issues, for example, service statements, or a message used for all customers, are printed. In the variable portion, objects, such as the names and addresses of customers to which, for example, service statements, are addressed, and messages for individual customers, are printed. In accordance with a predetermined layout used for all documents to be subjected to variable printing (hereinafter such documents will be referred to as "variable documents"), the image processing apparatus combines image data items of individual variable documents by using data representing objects printed in the fixed portion (hereinafter referred to as "fixed data") and data representing objects printed in the variable portion (hereinafter referred to as "variable data"). An object printed in the fixed portion and fixed data are examples of a first image and first image data, respectively, according to an exemplary embodiment of the invention. An object printed in the variable portion and variable data are examples of a second image and second image data, respectively, according to an exemplary embodiment of the invention.

Exemplary Embodiment

Configuration

Figure 1:
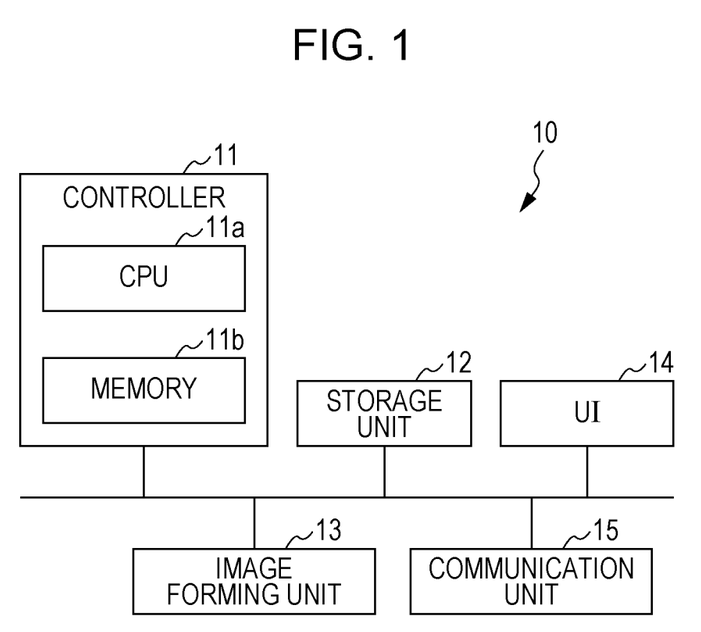
FIG. 1 illustrates an example of the configuration of an image forming apparatus including an image processing apparatus according to an exemplary embodiment.

FIG. 1 illustrates an example of the configuration of an image forming apparatus 10 according to an exemplary embodiment. The image forming apparatus 10, which is an electrophotographic printer, includes, as shown in FIG. 1, a controller 11, a storage unit 12, an image forming unit 13, a user interface (UI) 14, and a communication unit 15.

The controller 11 is an example of an image processing apparatus according to an exemplary embodiment of the invention. The controller 11 includes a central processing unit (CPU) 11a and a memory 11b which contains a read only memory (ROM) and a random access memory (RAM). The CPU 11a controls individual components connected to the controller 11 by executing a control program stored in the ROM or the storage unit 12. More specifically, the CPU 11a performs determination processing for determining, on the basis of a data format of each of fixed data and variable data associated with a layout of variable documents specified by a user, whether or not image data items representing the variable documents are to be combined by using compressed data representing the fixed data and the variable data. In accordance with a determination result obtained by the CPU 11a, the CPU 11a performs image processing for combining the image data items representing the variable documents. The CPU 11a also causes the image forming unit 13 to perform processing for forming, on a recording medium, such as paper, images represented by the image data items of the variable documents or images represented by image data items specified by a personal computer (PC) (not shown) through the use of the communication unit 15.

The storage unit 12 is a storage device, such as a hard disk. The storage unit 12 reads or writes various data items under the control of the controller 11. In the storage unit 12, data items representing variable documents are stored in advance. In this exemplary embodiment, data items representing variable documents include definition information 201, such as that shown in FIG. 2B, and fixed data 202, such as that shown in FIG. 3A, and variable data 203, such as that shown in FIG. 3B. The definition information 201 is described in a personalized print markup language (PPML) format and defines the layout of a variable document. The fixed data 202 and the variable data 203 are described in a portable document format (pdf).

Figure 2A:
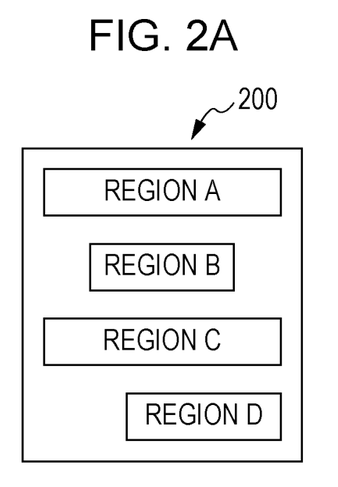
FIG. 2A illustrates an example of the layout of a variable document in an exemplary embodiment.
Figure 2B:
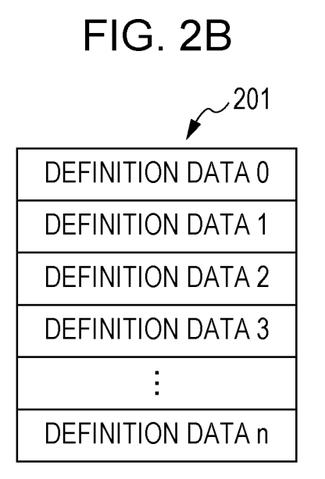
FIG. 2B illustrates an example of definition information concerning a variable document in an exemplary embodiment.

The definition information 201, the fixed data 202, and the variable data 203 in this exemplary embodiment will be described below with reference to FIGS. 2A and 2B. FIG. 2A illustrates the layout of a variable document 200 in this exemplary embodiment, and FIG. 2B illustrates the definition information 201 which defines the layout of the variable document 200 shown in FIG. 2A. In the example shown in FIG. 2A, the variable document 200 is formed of one page, and the fixed portion of the variable document 200 includes regions A and D, while the variable portion thereof includes regions B and C. The definition information 201 defining this layout will be specifically discussed below with reference to FIGS. 2B, 2C, and 2D.

Figure 2C:
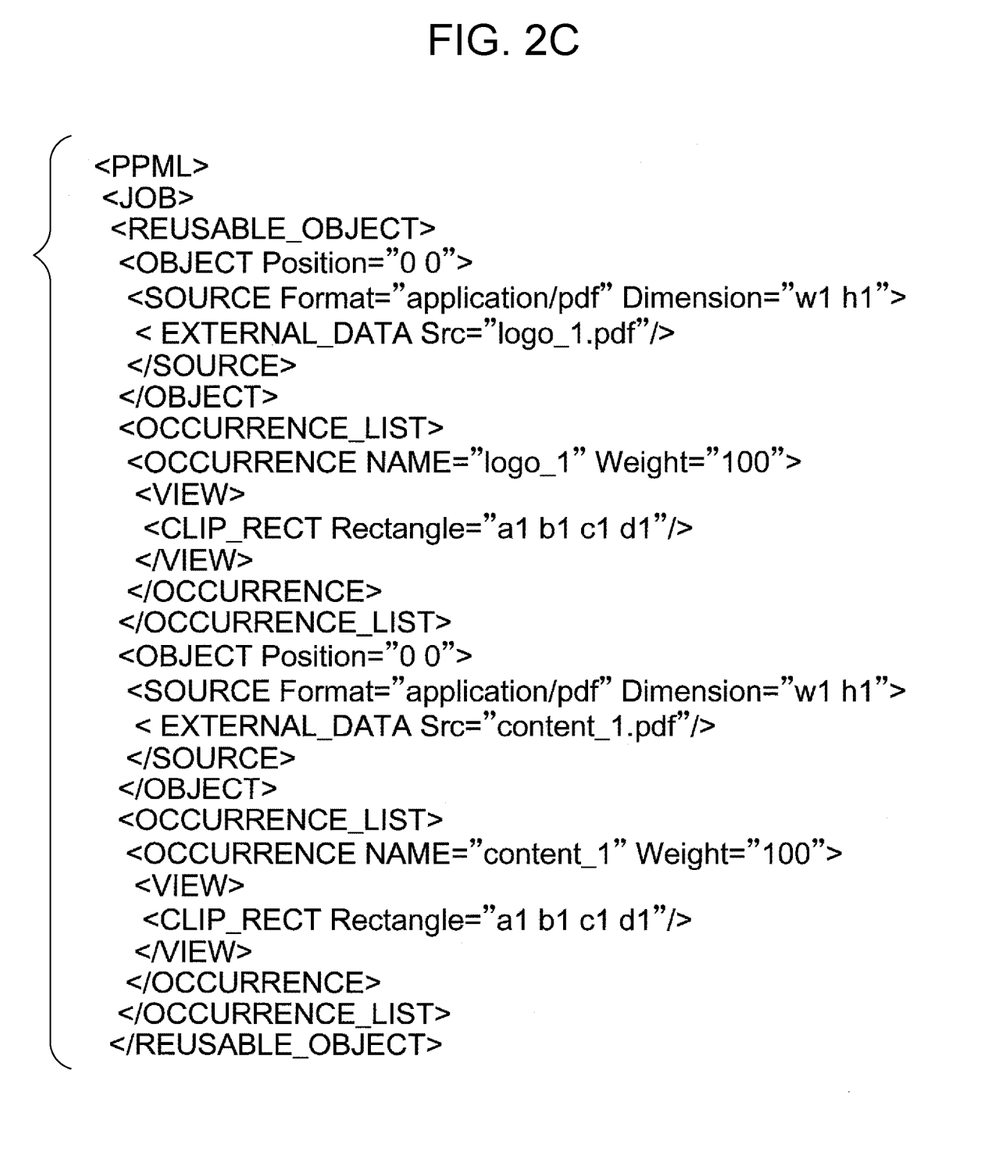
FIG. 2C illustrates an example of definition information concerning objects of a fixed portion in an exemplary embodiment.

The definition information 201 includes, as shown in FIG. 2B, definition data 0, which defines objects of the fixed portion, and definition data 1 through definition data n, which define the structures of the first through n-th variable documents, respectively. The definition information 201 also includes information (not shown) indicating the layout of the variable document 200 shown in FIG. 2A. An example of the content of the definition data 0 which defines the objects of the fixed portion is shown in FIG. 2C. In a section between the <REUSABLE_OBJECT> tag and the </REUSABLE_OBJECT> tag, files of the objects of the fixed portion are sequentially defined in <EXTERNAL_DATA> tags, and names of the objects are defined in <OCCURRENCE> tags. In this example, "logo__1.pdf" and "content__1.pdf" are defined as the files of the objects of the fixed portion.

Figure 2D:
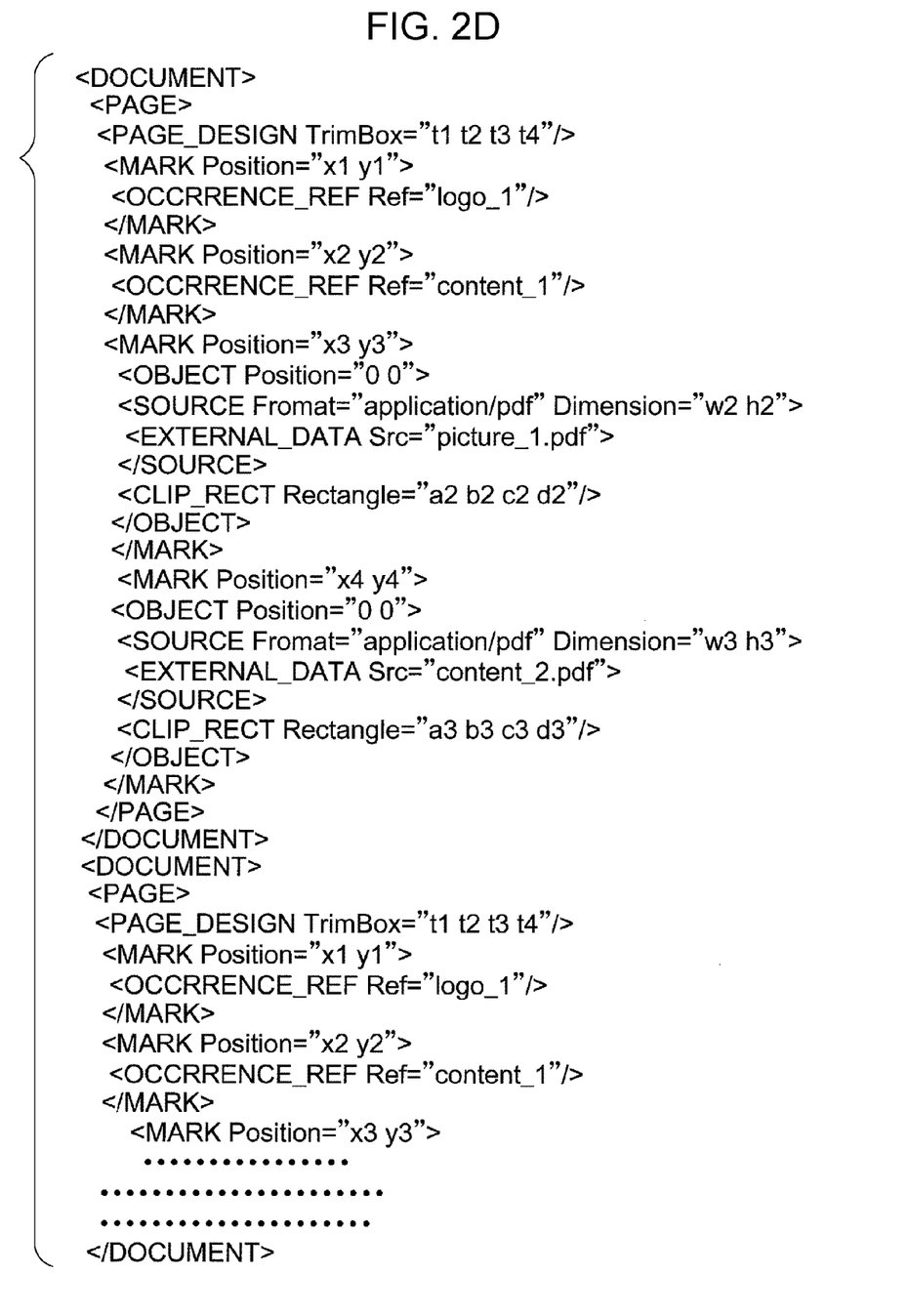
FIG. 2D illustrates an example of definition data concerning each of variable documents in an exemplary embodiment.

FIG. 2D illustrates examples of the contents of the definition data 1 through the definition data n. In FIG. 2D, in a section between the <DOCUMENT> tag and the </DOCUMENT> tag, the layout and the objects of a variable document corresponding to each of the definition data 1 through the definition data n are defined. This will be explained specifically by taking the definition data 1 as an example. Between a first set of tags <DOCUMENT> and </DOCUMENT>, in a section between a first set of tags <MARK> and </MARK>, the object "logo__1" to be placed in the region A of the fixed portion is defined, and in a section between a second set of tags <MARK> and </MARK>, the object "content__1" to be placed in the region D of the fixed portion is defined. In a section between a third set of tags <MARK> and </MARK>, the object "picture__1" to be placed in the region B of the variable portion is defined, and in a section between a fourth set of tags <MARK> and </MARK>, the object "content__2" to be placed in the region C of the variable portion is defined.

Concerning the definition data 2 through the definition data n, objects to be placed in the fixed portion and the variable portion are defined, in a manner similar to the definition data 1.

Figure 3A:
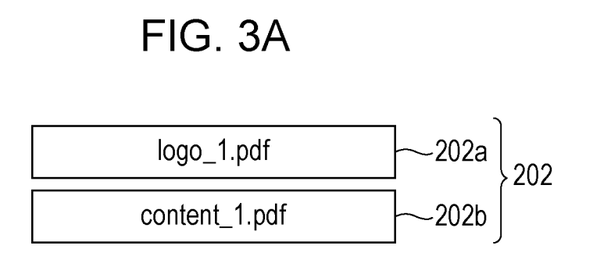
FIGS. 3A, 3B, and 3C illustrate fixed data and variable data representing a variable document in an exemplary embodiment.
Figure 3B:
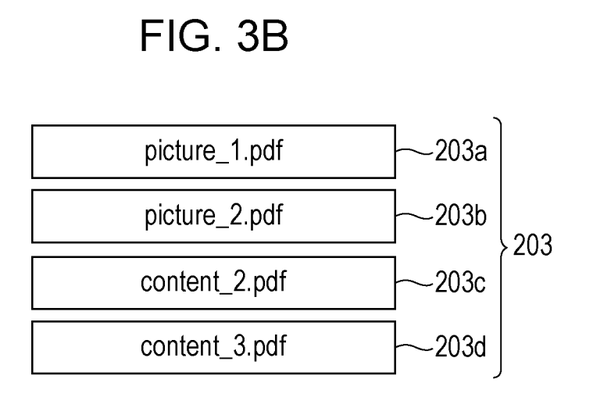
Figure 3C:
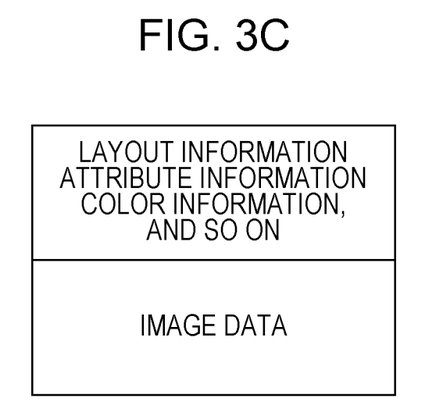

The fixed data 202 and the variable data 203 will be discussed below with reference to FIGS. 3A through 3C. FIGS. 3A and 3B illustrate the files of the fixed data and the variable data, respectively, disposed in the above-described variable document. The fixed data and the variable data, such as the objects "logo__1", "content__2", and "picture__1", are described in the pdf. As shown in FIG. 3C, in each file, image data representing an object, information concerning the colors of images (yellow (Y), magenta (M), cyan (C), and black (K)), layout information concerning the layout of a variable document associated with the file, and attribute information concerning the type of object (graphics, images, such as photographs, or characters) are described. The attribute information includes data format information indicating the data format of the object (vector data or bitmap data).

Referring back to FIG. 1, a description of the image forming apparatus 10 will be continued. The image forming unit 13 includes photoconductors corresponding to the individual YMCK colors, and forms, on a recording medium, images represented by image data of a variable document specified by the controller 11 by performing a series of processing, such as charging, exposure, developing, transfer, and fixing according to an electrophotographic system. The image forming unit 13 utilizes the electrophotographic system to form images merely by way of example, and may utilize an ink-jet system, a thermal transfer system, or another system. The UI 14 includes a touch panel and keys. The UI 14 transmits an operation signal indicating the content of an operation performed by a user operating the touch panel and the keys to the controller 11, and displays images specified by the user on the touch panel under the control of the controller 11. The communication unit 15 is a communication interface which is in conformity with communication protocols of, for example, a wired or wireless local area network (LAN), and sends and receives data to and from a PC connected to the image forming apparatus 10 under the control of the controller 11.

Figure 4:
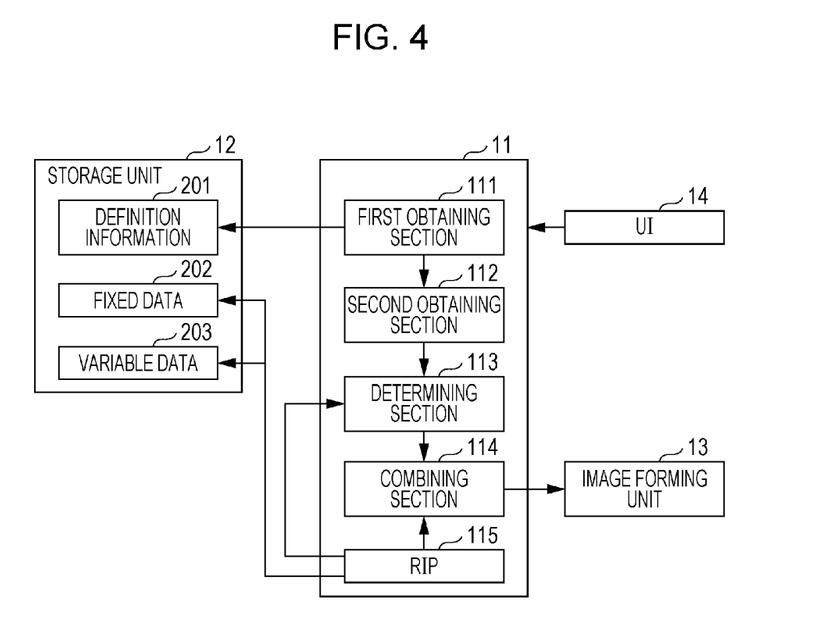
FIG. 4 is a functional block diagram illustrating a controller according to an exemplary embodiment.

The functions of the controller 11 will be discussed below with reference to FIG. 4. FIG. 4 is a functional block diagram concerning determination processing and image processing performed by the controller 11. The controller 11 includes a first obtaining section 111, a second obtaining section 112, a determining section 113, a combining section 114, and a raster image processor (RIP) 115. The first obtaining section 111 reads, from storage unit 12, definition information concerning the layout of each page specified by the user by using the UI 14, and fixed data and variable data corresponding to each page. Pages are units of printing of variable documents.

The second obtaining section 112 is an example of an obtaining unit. The second obtaining section 112 obtains attribute information. The attribute information has been determined from the fixed data and the variable data obtained by the first obtaining section 111, depending on whether an object contained in each of the fixed data and the variable data is a graphic, an image, or characters. The determining section 113, the combining section 114, and the RIP 115 are examples of a combining unit according to an exemplary embodiment of the invention. The RIP 115 rasterizes the fixed data and the variable data of each variable document. The determining section 113 determines amounts of image data representing objects forming the fixed data and the variable data of each variable document in accordance with the data formats described in the data format information included in the attribute information. In other words, the determining section 113 counts the number of pixels of objects forming the rasterized fixed data and variable data in accordance with the data formats. More specifically, the determining section 113 obtains the data format information from the attribute information and counts the numbers of pixels forming objects in accordance with the data formats. In this case, the determining section 113 may count the number of pixels for each page or for a group of plural pages. The determining section 113 determines, on the basis of the counted numbers of pixels for the data formats, whether compressed data generated by compressing the rasterized fixed data and compressed data generated by compressing the rasterized variable data (hereinafter referred to as "raster data") are to be utilized, or whether raster data of the fixed data and raster data of the variable data are to be directly utilized when combining the fixed data with the variable data.

That is, if, in one variable printing processing operation, the ratio of the number of pixels of bitmap data contained in the fixed data and the variable data to the total number of pixels of bitmap data and vector data contained in the fixed data and the variable data (hereinafter simply referred to as the "total number of pixels") is equal to or greater than a predetermined value, the determining section 113 determines that raster data of the fixed data and raster data of the variable data are to be directly combined. If the above-described ratio is smaller than the predetermined value, the determining section 113 determines that image data items are to be combined by utilizing compressed data generated by compressing the raster data of the fixed data and that of the variable data.

In variable printing, when combining fixed data with variable data, as the data size is smaller, the time taken to perform combining processing is decreased. Accordingly, the compression format that allows combining of compressed image data items, such as run-length encoding, is utilized. In compression processing, a compression time is shorter and a compression ratio is higher for images represented by vector data than images represented by bitmap data. In variable printing, if the ratio of the number of pixels forming bitmap data to the total number of pixels is large, it is not likely that a high compression ratio of bitmap data will be achieved, and even if images represented by bitmap data are compressed, the processing time may not be decreased. In this exemplary embodiment, therefore, when combining image data items, a determination is made as to whether compressed data of fixed data and that of variable data are to be utilized, or raster data of fixed data and that of variable data are to be directly utilized, on the basis of the proportion of the number of pixels forming specific objects placed in each variable document, i.e., objects, such as images, represented by bitmap data.

In accordance with a determination result obtained from the determining section 113, the combining section 114 performs image processing for generating image data representing a variable document by combining raster data obtained as a result of the fixed data being rasterized by the RIP 115 with each of raster data items obtained as a result of the variable data being rasterized by the RIP 115, or by combining compressed data generated by compressing raster data of the fixed data and that of the variable data. The combining section 114 sends the generated image data to the image forming unit 13.

Examples of Operations

Operations performed by the image forming apparatus 10 according to this exemplary embodiment will be described below. In this exemplary embodiment, preprocessing is performed for fixed data in response to a user instruction, and variable printing is performed by using the preprocessed fixed data. Examples of operations of preprocessing and variable printing will be discussed below. An example of a preprocessing operation performed by the image forming apparatus 10 will be discussed first with reference to the flowchart of FIG. 5. In step S11, the controller 11 of the image forming apparatus 10 determines whether a user has specified a layout of a variable document by using the UI 14. If the result of step S11 is YES, the process proceeds to step S12. In step S12, the controller 11 reads the pdf files of fixed data items corresponding to the specified layout from the storage unit 12, and rasterizes the fixed data items. Then, in step S13, the controller 11 reads attribute information concerning each fixed data item, and counts the numbers of pixels of an object forming each fixed data item in accordance with the data formats described in data format information included in the attribute information. Then, in step S14, the controller 11 stores, in the storage unit 12, the counted numbers of pixels of an object for the data formats, together with information concerning the specified layout.

Figure 5:
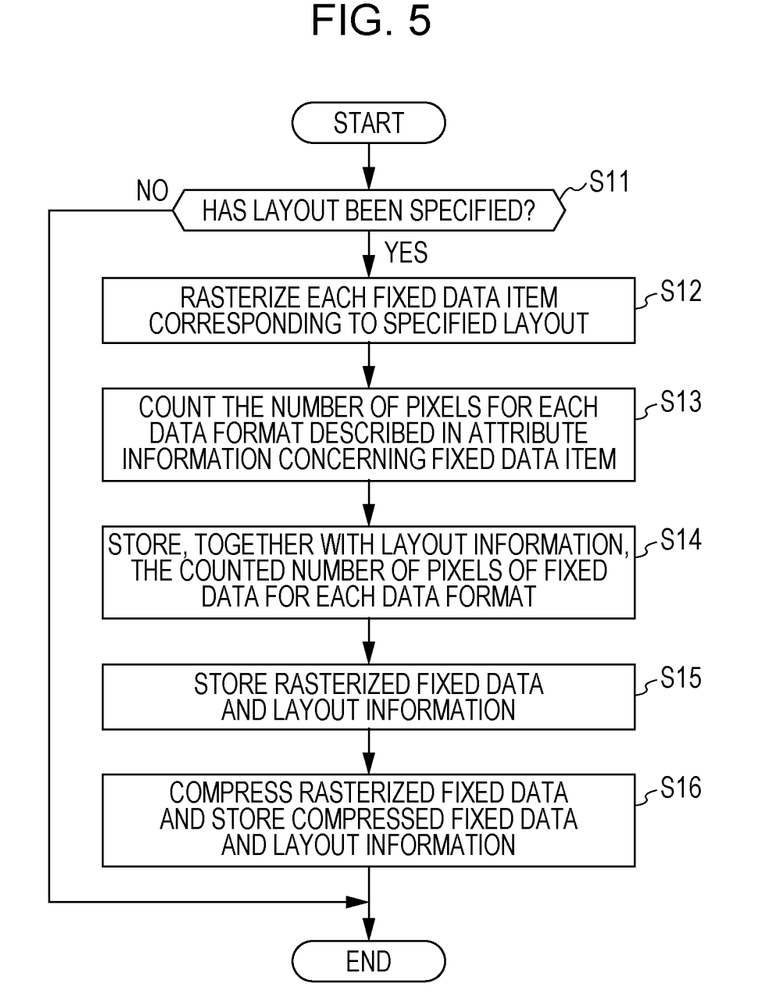
FIG. 5 is a flowchart illustrating preprocessing performed in an exemplary embodiment.

Subsequently, in step S15, the controller 11 stores, in the storage unit 12, raster data representing each fixed data item and information indicating the layout of the variable document specified by the user in association with each other. Then, in step S16, the controller 11 compresses each item of rasterized fixed data by using a predetermined compression format, and stores, in the storage unit 12, each item of compressed fixed data (compressed data) and information indicating the layout of the variable document specified by the user in association with each other. If the controller 11 determines in step S11 that the user has not specified a layout of a variable document by using the UI 14, the controller 11 enters the standby state to wait for the user to specify a layout.

Figure 6:
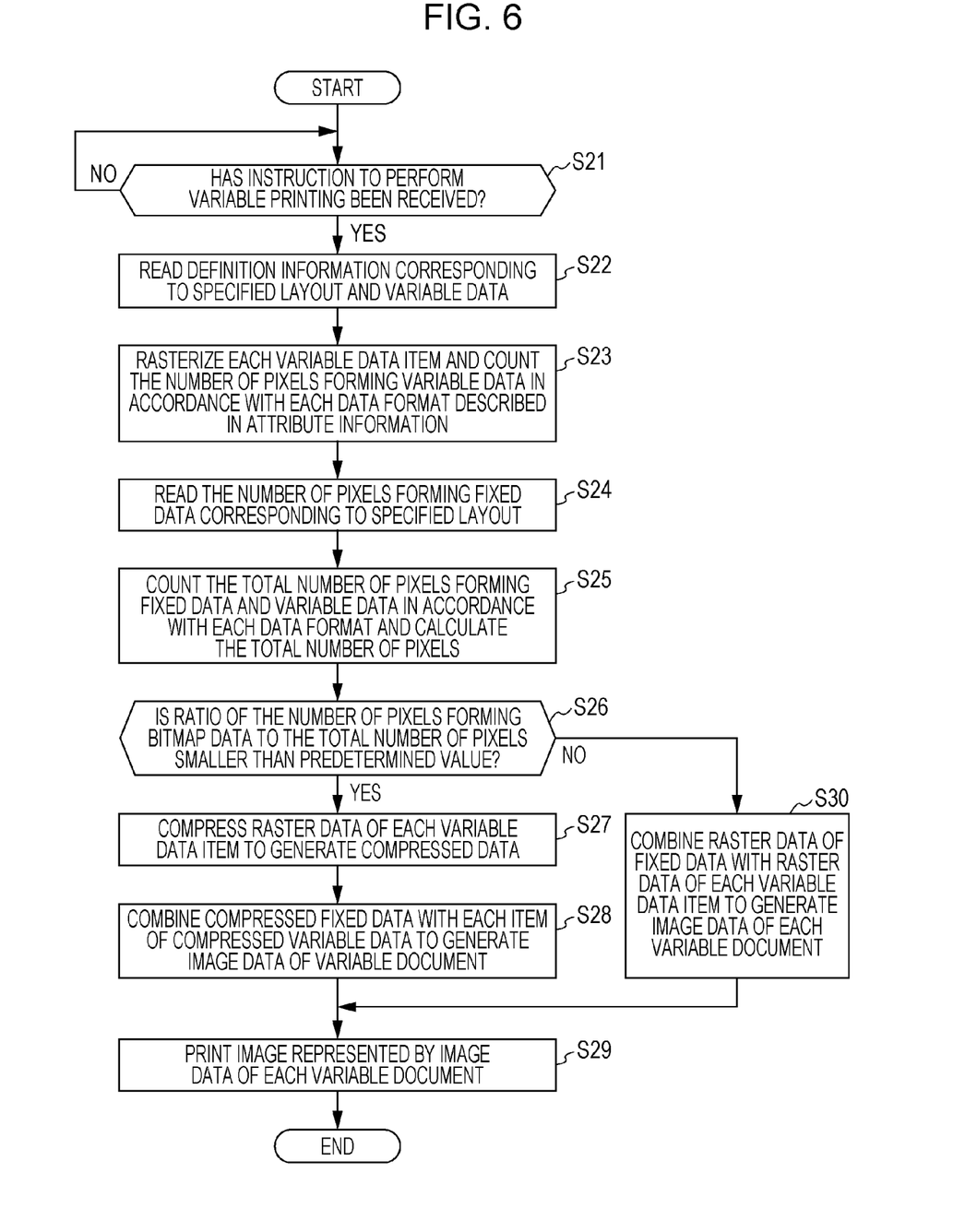
FIG. 6 is a flowchart illustrating variable printing processing performed in an exemplary embodiment.

A description will now be given of a variable printing processing operation performed by the image forming apparatus 10 with reference to the flowchart of FIG. 6. In step S21, the controller 11 determines whether a user has given an instruction to perform variable printing by specifying a layout of a variable document by using the UI 14. If the result of step S21 is YES, the process proceeds to step S22. In step S22, the controller 11 reads definition information concerning the specified layout and files of variable data items from the storage unit 12. Then, in step S23, the controller 11 rasterizes each item of the read variable data. The controller 11 also reads, from each variable data item, attribute information concerning each object forming the variable data item, obtains data format information from the attribute information, and counts the numbers of pixels of an object in accordance with the data formats described in the data format information. In step S24, the controller 11 reads, from the storage unit 12, the numbers of pixels of fixed data corresponding to the specified layout in accordance with the data formats described in the data format information. Then, in step S25, the controller 11 counts the total numbers of pixels forming the variable data counted in step S23 and pixels forming the fixed data read in step S24 in accordance with the data formats, and calculates the total number of pixels forming all the objects included in the fixed data and the variable data.

In step S26, the controller 11 determines whether the ratio of the number of pixels forming bitmap data (data format) to the total number of pixels calculated in step S25 is smaller than a predetermined value. If the controller 11 determines that the above-described ratio is smaller than the predetermined value, the process proceeds to step S27. In step S27, the controller 11 compresses the raster data of each variable data item by using a predetermined compression format, thereby generating compressed variable data. Then, in step S28, the controller 11 reads compressed data representing the fixed data corresponding to the specified layout and combines the read compressed fixed data with each of the compressed variable data items generated in step S27 in accordance with definition information, thereby generating image data representing each variable document. In step S29, the controller 11 sends the generated image data representing each variable document to the image forming unit 13, and the image forming unit 13 prints images represented by the image data on paper.

In step S26, if the controller 11 determines that the above-described ratio is not smaller than the predetermined value, the process proceeds to step S30. In step S30, the controller 11 reads the raster data representing the fixed data corresponding to the specified layout, and combines the read raster data representing the fixed data with raster data representing each variable data item in accordance with the definition information, thereby generating image data representing each variable document. Then, in step S29, the generated image data indicating each variable document is sent to the image forming unit 13, and the image forming unit 13 prints images represented by the image data on paper.

In the above-described exemplary embodiment, in variable printing, a determination is made as to whether or not fixed data and variable data are to be combined by using compressed data of the fixed data and compressed data of the variable data, in accordance with the ratio of the number of pixels forming bitmap data to the total number of pixels forming all objects contained in the fixed data and the variable data. For example, if many objects represented by bitmap data, which requires a longer compression time than vector data, are contained in a variable document, raster data of fixed data and raster data of variable data are combined. As a result, the time taken to perform combining processing is decreased compared with a case in which the raster data of the fixed data and the raster data of the variable data are compressed and are then combined. Additionally, in this exemplary embodiment, rasterizing processing for fixed data is not necessary when performing variable printing since it has already been performed in preprocessing, and thus, variable printing processing can be performed more efficiently, compared with a case in which preprocessing is not performed for fixed data.

Modified Examples

Although the present invention has been discussed through illustration of an exemplary embodiment, it may be carried out in various modes without being restricted to the above-described exemplary embodiment. For example, the invention may be implemented by modifying the above-described exemplary embodiment, as indicated in the following modified examples, or may be implemented by combining the modified examples.

(1) In the above-described exemplary embodiment, a determination is made whether or not a variable document is generated by utilizing compressed data, on the basis of a result of counting the numbers of pixels forming objects to be placed in each variable document printed in a variable printing operation in accordance with the data formats described in data format information contained in attribute information concerning the objects. Alternatively, the above-described determination may be made as follows. Each file of fixed data and variable data includes color information (YMCK) indicating colors of an object contained in the file. If each of the objects indicated by the fixed data and the variable data is defined in colors, raster data of each of the fixed data and the variable data is generated for each of the YMCK colors. Accordingly, in this modified example, the above-described determination is made on the basis of color information indicating each of the YMCK colors. In this case, in preprocessing, the controller 11 reads color information concerning each object from a file of the fixed data, rasterizes the fixed data for each of the colors indicated by the color information, counts the numbers of pixels forming the fixed data in accordance with the data formats described in the data format information obtained from the attribute information, and stores counting results, together with layout information, in the storage unit 12. The controller 11 stores in the storage unit 12, together with layout information, raster data representing the fixed data for each color indicated in the color information. The controller 11 also generates compressed data by compressing the raster data representing the fixed data for each color indicated in the color information, and stores, together with the layout information, the compressed data in the storage unit 12.

In variable printing processing, the controller 11 reads color information concerning each object from a file of the variable data, rasterizes the variable data for each color indicated by the color information, and counts the numbers of pixels forming the raster data for each color in accordance with the data formats described in the data format information obtained from the attribute information. The controller 11 then counts the numbers of pixels forming the fixed data for each color stored in the storage unit 12 and the numbers of pixels forming the variable data for each color in accordance with the data formats indicated in the data format information, and calculates, for each color, the ratio of the number of pixels forming bitmap data to the total number of pixels. If the above-described ratio calculated for each of the colors is smaller than a predetermined value, the controller 11 determines that image data is generated by using compressed data of the fixed data and compressed data of the variable data corresponding to the color. If the above-described ratio calculated for each of the colors is not smaller than the predetermined value, the controller 11 determines that image data is generated by using rater data of the fixed data and raster data of the variable data corresponding to the color.

(2) In the above-described exemplary embodiment, a determination is made whether or not a variable document is generated by utilizing compressed data, on the basis of a result of counting the numbers of pixels forming objects to be placed in each variable document printed in a variable printing operation in accordance with the data formats described in data format information contained in attribute information concerning the objects. Alternatively, the above-described determination may be made for each page of each variable document on the basis of a result of counting the numbers of pixels in accordance with the data formats. In this case, in preprocessing, the controller 11 counts the numbers of pixels of objects forming fixed data in each page in accordance with the data formats, and stores the page number, the counted number of pixels, and layout information in the storage unit 12 in association with one another. The controller 11 also rasterizes the fixed data of each page, and stores the raster data in the storage unit 12 in association with the page number and layout information. The controller 11 also compresses the raster data representing the fixed data of each page and stores the compressed data in the storage unit 12 in association with the page number and layout information. Then, in variable printing processing, the controller 11 counts the numbers of pixels of objects forming variable data of each page in accordance with the data formats, reads the numbers of pixels of the fixed data of the associated page in accordance with the data formats, and counts the total number of pixels forming the fixed data and the variable data of the associated page in accordance with each of the data formats. The controller 11 then makes the above-described determination on the basis of the counting result. The controller 11 combines the raster data or the compressed data of the fixed data with that of the variable data of the associated page on the basis of the determination result, thereby generating image data representing images of the associated page of a variable document.

(3) In the above-described exemplary embodiment and modified examples, as the amounts of images contained in a variable document, the numbers of pixels of each of objects forming fixed data and variable data to be placed in a variable document are counted in accordance with the data formats described in data format information, and determination processing is performed on the basis of the counted numbers of pixels. Alternatively, as the amounts of images contained in a variable document, the above-described determination processing may be performed by counting the numbers of objects in accordance with the data formats. In this case, in preprocessing, the controller 11 counts the numbers of objects forming each fixed data item in accordance with the data formats described in data format information, and stores, in the storage unit 12, the counted numbers of objects for the data formats together with layout information. The controller 11 also generates raster data and compressed data of the fixed data, and stores the generated raster data and compressed data in the storage unit 12. Then, in variable printing processing, the controller 11 counts the numbers of objects forming each variable data item in accordance with the data formats. The controller 11 then counts the numbers of objects forming the fixed data and the numbers of objects forming the variable data for the data formats, and compares the counted numbers of objects in accordance with the data formats. If the number of objects represented by bitmap data is smaller than that represented by vector data, the controller 11 determines that the compressed data of the fixed data and the compressed data of the variable data are to be utilized to generate image data representing a variable document. In contrast, if the number of objects represented by bitmap data is not smaller than that forming vector data, the controller 11 determines that image data representing a variable document is generated by utilizing the raster data of the fixed data and the raster data of the variable data.

(4) In the above-described exemplary embodiment, if the numbers of pixels per object represented by fixed data and those of variable data for the data formats have been determined in advance, the controller 11 may count the numbers of objects forming the fixed data and that forming the variable data in accordance with the data formats in a variable printing operation, and multiply the counted numbers of objects for the data formats by the numbers of pixels per object for the associated data formats stored in the storage unit 12, thereby calculating the numbers of pixels for the associated data formats.

(5) In the above-described exemplary embodiment, a determination is made whether image data is generated by utilizing compressed data of fixed data and that of variable data, on the basis of a result of comparing the ratio of the number of pixels forming bitmap data to the total number of pixels forming the fixed data and the variable data with a predetermined value. Alternatively, the above-described determination may be made on the basis of a result of comparing the number of pixels forming the bitmap data with that forming the vector data. That is, if the number of pixels of objects represented by bitmap data is smaller than that represented by vector data, the controller 11 determines that image data is generated by utilizing compressed data of the fixed data and that of the variable data. In contrast, if the number of pixels of objects represented by the bitmap data is not smaller than that represented by the vector data, the controller 11 determines that image data is generated by utilizing raster data of the fixed data and that of the variable data.

(6) In the above-described exemplary embodiment, in pre-processing, fixed data is compressed and stored in the storage unit 12 in advance. However, in variable printing processing, compression and storage of fixed data may be performed at the same time as that of variable data.

(7) In the above-described exemplary embodiment, the definition information 201 concerning variable printing, the fixed data 202, and the variable data 203 are stored in the storage unit 12 in advance. Alternatively, those items of information and data may be obtained from an external apparatus connected to the image forming apparatus 10 via the communication unit 15. Additionally, in the above-described exemplary embodiment, one pdf file defines each object forming the fixed data 202 and the variable data 203. However, one pdf file may define each of the entire fixed data and the entire variable data in a variable printing operation.

(8) In the above-described exemplary embodiment, attribute information including data format information is stored in each of fixed data and variable data. However, the controller 11 may analyze the data formats of fixed data and variable data in accordance with a specified layout so as to obtain data formats corresponding to the fixed data and the variable data.

(9) In the above-described exemplary embodiment, the controller 11 performs both of determination processing and image processing. However, determination processing and image processing may be performed in hardware including the RIP 115. Alternatively, the controller 11 may perform determination processing, and the hardware may perform image processing. Additionally, in the above-described exemplary embodiment, the determining section 113 counts the numbers of pixels forming raster data obtained by the RIP 115 in accordance with data formats. However, if the RIP 115 has a function of counting the numbers of pixels before rasterizing fixed data and variable data, the RIP 115 may count the numbers of pixels for the data formats described in data format information before rasterizing the fixed data and the variable data, and the determining section 113 may perform determination processing on the basis of the numbers of pixels counted for the data formats by the RIP 115.

(10) In the above-described exemplary embodiment, the definition information 201 is described in the PPML format. Alternatively, the definition information 201 may be described in a markup language, such as an Extensible Markup Language (XML).

(11) In the above-described exemplary embodiment, a measuring unit for measuring a compression processing time may be provided if compression processing for variable data is performed in variable printing processing. If the measured compression processing time is equal to or longer than a predetermined time, compressed data generated by compressing variable data may be stored in the storage unit 12. Then, if an instruction to perform variable printing processing on the stored variable data is given again, the compressed data of the variable data may be read from the storage unit 12, and compressed data of fixed data may be combined with the read variable data so as to generate image data representing a variable document. In this case, information for identifying a variable document in the variable printing processing may be stored in association with the compressed data of the variable data. With this configuration, if variable printing processing for a combination of fixed data and variable data which has been performed before is performed once again for the same combination, the variable data which has already been compressed can be used. Thus, the time taken to perform variable printing processing is reduced, compared with a case in which variable data is compressed every time variable printing processing is performed.

(12) In the above-described exemplary embodiment, the following configuration may be employed by considering the fact that, as the difference between the amount of images represented by vector data and that represented by bitmap data is larger, the effect of reducing the time taken to perform variable printing processing is increased. If the amount of images represented by vector data is larger than that represented by bitmap data and if the difference between the two amounts is equal to or greater than a predetermined value, image data representing a variable document may be generated by utilizing compressed data of fixed data and compressed data of variable data.

(13) In the above-described exemplary embodiment, information indicating whether to perform compression processing for each object forming variable data (hereinafter such information may be referred to as "compression information") may be added and stored. Assume that, in a variable printing operation, the controller 11 determines, on the basis of the amounts of images for the data formats, that compressed data of fixed data and compressed data of variable data are not to be utilized. Even in this case, if compression information indicating that compression processing is to be performed for each variable data item representing an image to be placed in a variable document is added, each variable data item associated with the variable document may be compressed, and image data may be generated by utilizing the compressed data of the variable data and the compressed data of the fixed data.

(14) In the above-described exemplary embodiment, determination processing for determining whether to utilize compressed data generated by compressing fixed data and variable data is performed on the basis of the amounts of images measured in accordance with the data formats described in data format information contained in attribute information concerning objects, and image data is generated by utilizing the compressed data, depending on a determination result. Alternatively, the amount of images may be measured in accordance with each of attributes indicating the types of objects (graphics, images, such as photographs, or characters) described in attribute information, and determination processing may be performed on the basis of the amount of images measured in accordance with each of the attributes.

(15) The program executed by the controller 11 in the above-described exemplary embodiment and modified examples may be provided by being recorded on a computer readable recording medium, such as a magnetic recording medium (magnetic tape, a magnetic disk, etc.), an optical recording medium (an optical disc, etc.), a magneto-optical recording medium, or a semiconductor memory. The program may also be downloaded into the image forming apparatus 10 by using a communication medium, such as the Internet.

The foregoing description of the exemplary embodiment and modified examples of the present invention has been provided for the purposes of illustration and description. It is not intended to be exhaustive or to limit the invention to the precise forms disclosed. Obviously, many modifications and variations will be apparent to practitioners skilled in the art. The embodiment and modified examples chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an obtaining unit that obtains, from attribute information, data format information indicating data formats of first image data representing a first image and second image data representing a second image, the attribute information being included in each of the first image data and the second image data, the first image being printed at predetermined positions in all units of printing, the second image being changed in accordance with the individual units of printing and being printed at predetermined positions in the individual units of printing; and
   a combining unit that determines a number of pixels of bitmap data in the first image data and the second image data using in the data format information, and that in response to a determination that a ratio of the number of pixels of bitmap data to a total number of pixels in the first image data and the second image data is smaller than a predetermined value, combines compressed data generated by compressing raster data representing the first image data with compressed data generated by compressing raster data representing the second image data,
   wherein in response to a determination that the ratio of the number of pixels of bitmap data to the total number of pixels of mages in the first image data and the second image data is not smaller than the predetermined value, the combining unit combines the first image data with the second image data by directly utilizing raster data representing the first image data and raster data representing the second image data.

2. The image processing apparatus according to claim 1, wherein the combining unit determines a number of pixels of vector data in the first image data and the second image data using the data format information, and determines the total number of pixels in the first image data and the second image data by summing the number of pixels of bitmap data and the number of pixels of vector data.

3. An image processing method comprising:
   obtaining, from attribute information, data format information indicating data formats of first image data representing a first image and second image data representing a second image, the attribute information being included in each of the first image data and the second image data, the first image being printed at predetermined positions in all units of printing, the second image being changed in accordance with the individual units of printing and being printed at predetermined positions in the individual units of printing; and
   determining a number of pixels of bitmap data in the first image data and the second image data using the data format information, and in response to a determination that a ratio of the number of pixels of bitmap data to a total number of pixels in the first image data and the second image data is smaller than a predetermined value, combining compressed data generated by compressing raster data representing the first image data with compressed data generated by compressing raster data representing the second image data,
   wherein in response to a determination that the ratio of the number of pixels of bitmap data to the total number of pixels of images in the first image data and the second image data is not smaller than the predetermined value, the first image data is combined with the second image data by directly utilizing raster data representing the first image data and raster data representing the second image data.

4. A non-transitory computer readable medium storing a program causing a computer to execute a process, the process comprising:
obtaining, from attribute information, data format information indicating data formats of first image data representing a first image and second image data representing a second image, the attribute information being included in each of the first image data and the second image data, the first image being printed at predetermined positions in all units of printing, the second image being changed in accordance with the individual units of printing and being printed at predetermined positions in the individual units of printing; and
determining a number of pixels of bitmap data in the first image data and the second image data using the data format information, and in response to a determination that a ratio of the number of pixels of bitmap data to a total number of pixels in the first image data and the second image data is smaller than a predetermined value, combining compressed data generated by compressing raster data representing the first image data with compressed data generated by compressing raster data representing the second image data,
wherein in response to a determination that the ratio of the number of pixels of bitmap data to the total number of pixels of images in the first image data and the second image data is not smaller than the predetermined value, the first image data is combined with the second image data by directly utilizing raster data representing the first image data and raster data representing the second image data.

\* \* \* \* \*